(12) United States Patent
Lund

(10) Patent No.: US 12,425,727 B2
(45) Date of Patent: Sep. 23, 2025

(54) METHOD AND A DEVICE FOR PROVIDING DATA FROM A NETWORK CAMERA

(71) Applicant: Axis AB, Lund (SE)

(72) Inventor: Mats Lund, Lund (SE)

(73) Assignee: Axis AB, Lund (SE)

( * ) Notice: Subject to any disclaimer, the term of this patent is extended or adjusted under 35 U.S.C. 154(b) by 242 days.

(21) Appl. No.: 18/327,348

(22) Filed: Jun. 1, 2023

(65) Prior Publication Data

US 2023/0403462 A1    Dec. 14, 2023

(30) Foreign Application Priority Data

Jun. 10, 2022  (EP) ..................................... 22178417

(51) Int. Cl.
*H04N 23/661* (2023.01)
*H04L 9/40* (2022.01)
*H04N 7/10* (2006.01)

(52) U.S. Cl.
CPC ......... *H04N 23/661* (2023.01); *H04L 63/083* (2013.01); *H04N 7/10* (2013.01)

(58) Field of Classification Search
CPC ........ H04N 23/661; H04N 7/10; H04N 7/181; H04N 23/66; H04L 63/083
See application file for complete search history.

(56) References Cited

U.S. PATENT DOCUMENTS

| | | | |
|---|---|---|---|
| 8,826,353 B2 | 9/2014 | Takahashi | |
| 10,110,855 B2 | 10/2018 | Bateman et al. | |
| 2004/0222982 A1* | 11/2004 | Imai | G06F 9/4415 345/204 |
| 2009/0172088 A1* | 7/2009 | Chan | H04L 67/025 709/203 |
| 2012/0278877 A1* | 11/2012 | Baum | H04L 63/20 726/12 |
| 2014/0280725 A1 | 9/2014 | Kasatani | |
| 2016/0366373 A1* | 12/2016 | Siminoff | H04N 23/661 |
| 2017/0201513 A1* | 7/2017 | Krempel | H04L 63/0853 |
| 2018/0132290 A1 | 5/2018 | Shen | |
| 2018/0234484 A1 | 8/2018 | Hesselink et al. | |

(Continued)

FOREIGN PATENT DOCUMENTS

CN        101369979 A    2/2009

OTHER PUBLICATIONS

Extended European Search Report dated Dec. 12, 2022 for European Patent Application No. 22178417.6.

*Primary Examiner* — Albert H Cutler
(74) *Attorney, Agent, or Firm* — Volpe Koenig

(57) ABSTRACT

A method for providing data from a network camera performed in a processing unit of a portable device having a physical communication interface, whereby the portable device has been associated with the network camera. The method comprises: upon detecting a connection to a connected client device at the physical communication interface, establishing a connection to the associated network camera using association data that have been received from the associated network camera when the portable device became associated with the network camera; receiving data from the network camera via the established connection; and transmitting the received data to the connected client device. A portable device and a system of a portable device and a network camera are also disclosed.

15 Claims, 2 Drawing Sheets

(56) References Cited

U.S. PATENT DOCUMENTS

2020/0092282 A1* 3/2020 Childress ............... G06F 21/44
2021/0020006 A1* 1/2021 Schieltz ............... H04W 12/08
2021/0036906 A1* 2/2021 Chevalier ........... H04L 65/1101

* cited by examiner

METHOD AND A DEVICE FOR PROVIDING DATA FROM A NETWORK CAMERA

FIELD OF INVENTION

The present disclosure relates to the field of network camera systems; and more particularly to a method of delivering data, for example video, from a network camera to a client device.

TECHNICAL BACKGROUND

Network camera systems today are common for serving a variety of purposes, for example surveillance or monitoring of indoor and outdoor areas. A network camera system typically comprises a plurality of network cameras that are setup in an infrastructure for allowing data transmission from the network cameras to one or more client devices. The infrastructure may implement wired and/or wireless communication. The client devices may comprise mobile device, such as phones, laptops, and tablets, and/or stationary devices such as workstations. This type of system requires a careful configuration to make sure that the system works properly for all functions of the system, for example monitoring areas by multiple cameras, controlling mechanical motion of PTZ cameras, or adjusting software configurations of cameras. If the network system is extended with another network camera or client device, manual configuration of the system is typically required.

Although there are great benefits in having a network camera system of this kind, it lacks in flexibility with respect to some scenarios. For example, if a client device is to be temporary added to the system during a shorter period of time, such as a day, for providing a user with the function of displaying video, there is a relatively high amount of configuration required for providing a non-complex function during this short period of time. Thus, there is room for improvement in the prior art with respect to flexibility and improved functionality in network camera systems.

SUMMARY

An aim of the disclosure is to provide a user-friendly and flexible solution for providing data, for example a video stream or a video clip, from a network camera to a client device, as defined by the appended claims.

According to a first aspect, a method provides data from a network camera. The method is performed in a processing unit of a portable device that has a physical communication interface. The portable device has been associated with the network camera in a process that precedes the method. The method comprises the following steps:

a) upon detecting a connection to a connected client device at the physical communication interface, establishing a connection to the network camera using association data that has been received from the associated network camera when the portable device became associated with the network camera, b) receiving data from the network camera via the established connection, and c) transmitting the received data to the connected client device.

According to the first aspect a method is thus performed in a portable device which is adapted for being physically connected to a client device. Upon connection, and in response to detecting a connection at the physical communication interface, the portable device automatically connects via a wireless network to a network camera that it has been associated with beforehand. The portable device retrieves data from the network camera and transmits the data to the connected client device which, in turn, can present the received data to a user. The data may comprise video data, image data, video metadata, and/or image metadata.

The portable device is thus adapted to provide data in a plug and play (PnP) manner from a single network camera that may be part of a network camera system. Since logic for connecting to the network camera and retrieving data therefrom is provided in the portable device, there is no need for configuring the client device to be included in the network camera system or to have direct connection to the camera. A client device that is used for only viewing data from the network camera, and not for sending commands to or making setting adjustments of the network camera, does not need to have a direct connection and for this purpose the proposed method works as a user-friendly and flexible solution. In addition, the lack of connection between the client device and the network camera can also be a benefit from a security perspective. Since it is only the portable device that needs to connect to the network camera, the client device can be kept out of the connection and be prevented from accessing settings or other camera information. The method can be seen as a complement to the known way of including a client device in a network camera system, when the client device needs to have access to functionalities beyond only receiving data from the network camera.

As used herein "portable device" means a physical device that is constructed with the purpose of being easily moved, for example carried with a user. The portable device is not permanently wired or otherwise physically connected to another device. The portable device is adapted for temporally connections via its physical connection interface and possibly by other interfaces such as a charging input. The portable device is preferably powered by the device it is connected to. Power is preferably supplied via the same connection as used for data exchange. The portable device may thus comprise a physical communication interface that is adapted for both power supply input and data exchange communication. Examples of portable devices include, but are not limited to, USB devices such as USB sticks, and HDMI devices such as HDMI sticks.

As used herein, "network camera" means a digital camera that is connected to a wireless or wired network for transmitting and, optionally, receiving data. A network camera can also be referred to as an IP camera or netcam. The network camera acquires digital images or video via an image sensor, such as CMOS sensor. There is a wide complexity range of network cameras. The present disclosure is not limited to any particular type of network camera.

As used herein, "associated" means that an association has been setup between two devices, in this case the portable device and the network camera. The association is setup by that the portable device and network camera exchanges information, herein called association data, that can be used for identifying each other. In other words, once associated, the portable device knows the identity of the network camera and vice versa. The association may also be referred to as pairing of the device, however without any limitations to how the association is carried out. The portable device and the network camera may exchange association data via a wired (physical) or wireless connection. After the association has been created, the network camera and the portable device store the identity information about the other device in an internal memory for later use when the portable device wants to connect to the network camera for retrieving data. The connection between the portable device and the network camera, at this later phase, is not performed via a wired connection from the portable device to the network camera. In other words, the portable device does not need to have a physical connection to the network camera while being connected to the client device and providing data from the network camera.

As used herein, "client device" means an electronic device that has a physical communication interface for connecting to the portable device. The physical communication interface of the client device can for example be a connector input that can receive a connector of the portable device. The client device may comprise, or be connected to, a display unit for presenting images or video.

In one embodiment, the physical communication interface of the portable device comprises a universal serial bus (USB). The portable device may in that case be referred to as a USB stick. When establishing a connection to the connected client device, the USB stick may send a class code to the connected client device to present itself as a device that delivers video or image. An advantage with this embodiment is that the client device then expects to receive data in the form of images or video from the USB stick and can prepare a suitable presentation of the data at the client device.

In one embodiment, a network address of the associated network camera is retrieved from a name server. A purpose of the name server is to keep updated information about associations between network cameras and portable devices, and addresses to the network cameras. A benefit with this embodiment is that the portable device does not need to store information about the network camera or its network address, thus decreasing the security risk of unnecessary exposure of the information.

Another feature that can make the solution more secure is that the portable device comprises a module for wireless communication which is utilized for establishing a connection to the network camera for retrieving data. A private and secure connection may thus be achieved. By private connection is meant that the connection is restricted to communication between the portable device and the network camera. In addition, the method may in this embodiment be performed independent of the connectivity of the connected client device. The client device can even be offline and still receive data from the network camera.

Regardless of how the portable device establishes a connection to the network camera, may it be via an own wireless communication module or via an Internet connection of the connected client device, the connection may be performed in an encrypted manner. For example, the connection may be established as a virtual private network (VPN) or similar solution for increasing the security of the connection.

In another embodiment, the portable device requires an input of valid authentication data by a user for delivering data from the associated network camera. The authentication data may be in the form of a PIN code, fingerprint, or other biometric data, and be input at a physical authentication interface of the portable device. A benefit of this embodiment is that the access to data from the associated network camera can be restricted to certain users.

According to a second aspect, there is provided a portable device for providing data from a network camera. The portable device comprises a processing unit and a physical communication interface. The portable device has been associated with the network camera. The processing unit is arranged to:

a) upon detecting a connection to a connected client device at the physical communication interface, establish a connection to the network camera using association data that has been received from the associated network camera when the portable device became associated with the network camera, b) receive data from the network camera via the established connection, and c) transmit the received data to the connected client device.

The portable device of the second aspect may generally be embodied in the same ways as the method of the first aspect with accompanying advantages. For example, the physical communication interface may be a USB, the portable device may further comprise a module for wireless communication, and the portable device may further comprise a physical authentication interface.

According to a third aspect, there is provided a system comprising a network camera and a portable device. The system is adapted to:

exchange association data between the portable device and the network camera to create an association, upon detecting a connection to a connected client device at a physical communication interface of the portable device, establish a connection between the portable device and the network camera using the association data, transmit data from the network camera to the portable device via the established connection, and transmit the data from the portable device to the connected client device via the physical communication interface.

In one embodiment, the system may be further adapted to trigger an exchange of association data between the portable device and the network camera upon detecting a connection to the network camera at the physical communication interface.

The system may further comprise a name server. In this embodiment, the system may be further adapted to:

upon detecting the connection to the connected client device at the physical communication interface of the portable device, transmitting a request to the name server comprising the association data, and in response to receiving the request at the name server, transmitting a network address of the network camera associated with the portable device to the portable device.

The system of the third aspect may generally be embodied in the same ways as the method of the first and second aspects with accompanying advantages.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the claims are not limited to the particular component parts of the device described or steps of the methods described as such device and method may vary. It is also to be understood that the terminology used herein is for purpose of describing particular embodiments only, and is not intended to be limiting.

It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The disclosure will now be described in more detail by way of example and with reference to the accompanying schematic drawings, in which.

DETAILED DESCRIPTION

A preferred embodiment will now be described with reference to the figures.

Figure 1:
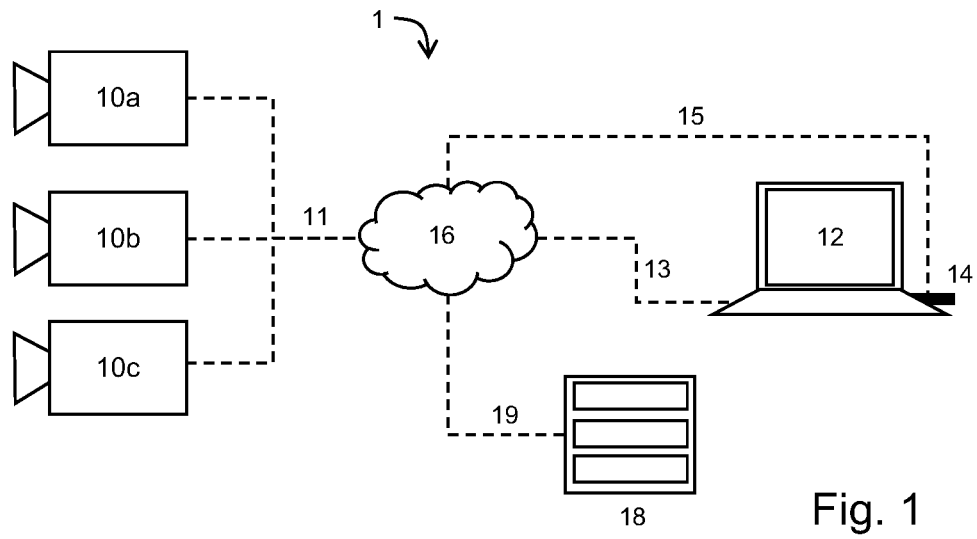
FIG. 1 illustrates a system in which a portable device is connected to a client device for providing data from an associated network camera.

An example of a system 1 of connected devices is illustrated in FIG. 1. A plurality of network cameras 10a-10c are connected via a wired or wireless connection 11 to the Internet 16. The network cameras 10a-10c may be part of a network camera system 1 that comprises further devices such as camera servers. The system 1 further comprises a client device 12 to which a portable device 14 is physically connected. The client device 12 is here illustrated as a laptop, and the portable device 14 as a USB stick.

The client device 12 may be adapted to connect to the Internet 16 via a wired or wireless connection 13. The system 1 also comprises a name server 18 which is connected via a wireless or wired connection 19 to the Internet 16. The function of the name server 18 will be explain in detail later.

The system 1 is illustrated in a so-called operational mode, which herein means a state when the portable device 14 is connected to the client device 12. The operational mode is preceded in time by a setup mode in which the portable device 14 becomes associated with one or more of the network cameras 10a-10c. In this example, the portable device 14 is associated with a first network camera 10a of the network camera system. During the setup phase, the portable device is connected to the network camera 10a. For example, a physical connection may be established via the physical communication interface of the portable device 14. In case the portable device 14 is a USB stick, the portable device 14 may be connected via a USB port of the network camera 10a. While connected, the portable device 14 and the network camera 10a exchange association data. The purpose of the association data is that the devices can uniquely recognize each other at a later connection session. The association data may for this purpose include a unique ID. The unique ID may be created during the setup phase or be based on already known information, such as a device serial number. The ID may comprise plaintext in the form of letters or digits. The association data may further comprise a digital certificate to assure a higher level of security. A digital certificate is an electronic document that is designed for being able to authenticate an entity carrying the certificate. The portable device 14 and the network camera 10a may thus exchange certificates and other essential data for carrying out a certificate-based authentication. The skilled person realizes that there exist many alternative solutions to certificates and that the inventive method may be adjusted to apply those alternatives instead.

In some embodiments, the association data may include a network address to the network camera 10a which is received by the portable device 14. The portable device 14 can use the network address for connecting to the network camera 10a in the operational phase. In another embodiment, the portable device 14 retrieves a current network address of the network camera 10a from the name server 18. A purpose of the name server 18 is to keep an updated list of network addresses of network cameras 10a-10c, in particular of those which are associated with one or more portable devices. Another purpose of the name server 18 is to function as a gate keeper for the network cameras 10a-10c. If the name server 18 receives a request from a portable device that the name server 18 does not have listed as being associated with any network camera, the name server 18 may be configured to not respond to the request. Thus, addresses of network cameras are exposed, i.e. given out by the name server 18, only when a verified association between the requester (the portable device) and a network camera exists. In addition, the association between a portable device and a network camera can be easily revoked by a change in the name server 18. Thus, there is no need to access either the network camera or the portable device, which location may be unknown, for revoking the access for the portable device 14 to a network address of the network camera.

When the portable device 14 and the associated network camera 10a have exchanged the association data, the connection is shut down by a disconnection. The portable device 14 and the network camera 10a do typically not exchange any more data until the operational phase.

Figure 2:
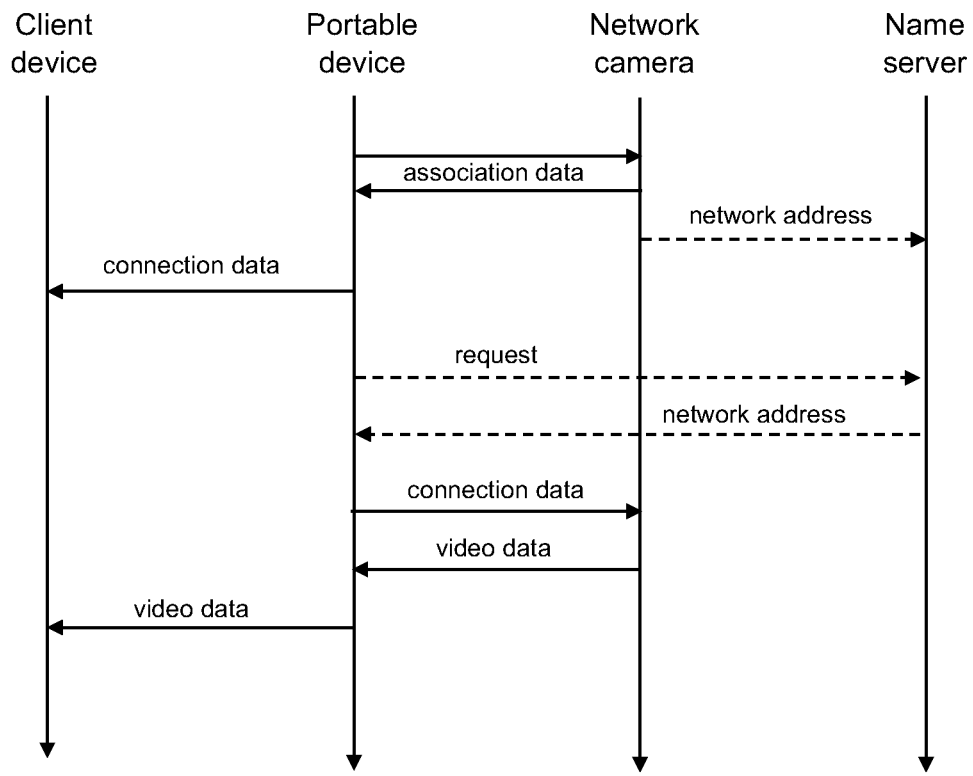
FIG. 2 illustrates a process flow of data transmission within the system of FIG. 1.

FIG. 2 illustrates data transmission that is carried out between the devices of the system 1 during the setup phase and the operational phase. The data transmissions are illustrated in a temporal order from top to bottom.

To start with, the portable device 14 and the network camera 10a exchange association data. As an optional process step, the network camera 10a sends association data, or at least parts thereof, to the name server 18 including its current network address. The association data that is sent to the name server 18 includes at least an identity of the network camera 10a and an identity of the portable device 14. The name server 18 stores the received data in a suitable format, for example a lookup table (LUT), to be able to inform the portable device 14 of the network address at a later stage. The network camera 10a is preferably configured to update the name server 18 with its current network address upon a change of address or at regular intervals to keep the address stored in the name server 18 up to date. In an embodiment where the name server 18 acts as an address provider for the portable device 14, it is sufficient that the portable device 14 receives an identity of the network camera in association data. It may be beneficial that the portable device 14 does not carry any data that can provide access to the network camera 10a, thus improving security against unauthorized access attempts against the network camera 10a.

The setup phase is thereby finished and the portable device 14 is disconnected from the network camera 10a. The portable device 14 may be seen as being in a standby mode while monitoring its physical connection interface. Upon a detection that a client device 12 is connected at the physical connection interface, the portable device 14 initiates the operational phase by establishing a connection with the client device 12. The establishment follows standard connection protocols. In case the portable device 14 is a USB stick, the portable device 14 may establish a connection according to standard procedure and inform the client device of its USB class code that represents a class for transmitting video or images. Non-limiting examples of class codes are base class 0Eh and base class 10h.

The client device 12 can then prepare for receiving data in the form of images and video by, for example, configuring an image or video display software to open upon receiving data from the portable device 14.

In an embodiment where the name server 18 plays a role of keeping information about the network address to the network camera 10a, the portable device 14 sends a request to the name server 18 for the network address of the network camera 10a. The request comprises the identity of the portable device 14, the identity of the associated network camera 10a, and optionally a certificate or other authentication data that have been exchanged or created at the association with the associated network camera 10a. The name server 18 receives the request and, optionally, evaluates the received certificate or other authentication data. Upon the portable device 14 being verified, the name server 18 responds to the request with the current network address of the associated network camera 10a.

In another discussed embodiment, the portable device 14 has received a network address of the associated network camera 10a as part of the association data.

Regardless of how the network address becomes known for the portable device 14, it establishes a connection to the network camera 10a by sending connection data. The connection data may include data for establishing a push or pull connection, where data can be pulled from the network camera 10a by the portable device 14 or pushed from the network camera 10a to the portable device 14. The connection data may further comprise authentication data, such as certificates that were exchanged during the setup phase, which may be evaluated by the receiving device before the connection becomes established.

Once the connection is established between the portable device 14 and the network camera 10a, data from the network camera 10a is sent from the network camera 10a to the portable device 14. In this example, the data is video data. In other embodiments, the data may be image data, image metadata, or video metadata. Such metadata comprises information resulting from analytics performed on images or video, for example object detection, event detection, face recognition, license plate recognition, motion detection, etc. The data that is sent from the network camera 10a may comprise additional data, besides video, image or metadata. For example, video data may comprise audio data that is recorded while acquiring the video. The format of the data that is sent from the network camera 10a may be an encoded video format. An advantage is then that the required processing power at the portable device 14 can be kept low since no encoding of the received data is required.

The data may be sent via a connection established directly between the portable device 14 and the network camera 10a, or via a connection established through the connected client device 12. The portable device 14 may thus establish a connection to the network camera 10a via the client device 12 and its connection to the Internet 16.

Upon receiving the video data at the portable device 14, it is forwarded to the connected client device 12 which presents it to a user. In case the data comprises video or image, the client device 12 may display the data in a video or image software player or in a video management system (VMS) software.

Figure 3:
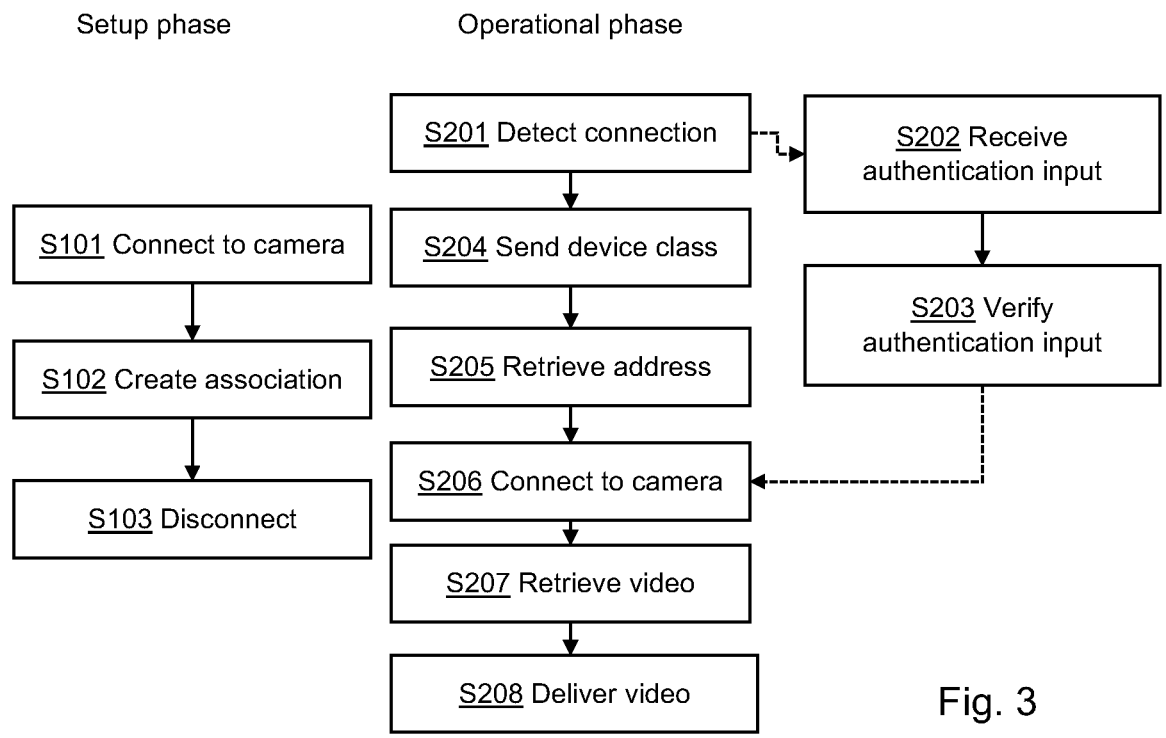
FIG. 3 illustrates methods performed in a portable device in a setup phase and in an operational phase, respectively.

As evident, the portable device 14 plays a key role of the proposed method. The portable device 14 is the initiator during the operational phase and thus comprises the logic for carrying out essential steps of the proposed method during the operational phase. FIG. 3 illustrates the method as carried out by the portable device 14. During the setup phase, the method comprises connecting S102 to a selected network camera, creating S102 an association with the connected network camera by sending and receiving association data, and disconnecting S103. During the operational phase, the portable device 14 is arranged to detect S201 a connection at its physical connection interface to a client device 12. In this example embodiment, the portable device 14 is in the form of a USB stick is adapted to inform the client device 12 about its USB class code. Once the connection is established to the client device 12, the portable device 14 retrieves the network address of the associated network camera 10a, from a memory or from a name server 18, and connects S206 to the associated network camera 10a. Video, or other network camera data, is retrieved from the associated network camera 10a and transmitted (delivered) S208 to the connected client device 12.

In one embodiment, the portable device 14 is configured to receive authentication data input by a user. The authentication data may be in the form of a PIN code or biometric data input via a physical input interface of the portable device 14. As illustrated, the method may comprise additional steps of receiving S202 authentication input and verifying S203 the authentication input. The continuation of the rest of the method may be dependent on a successful verification outcome. The steps of receiving S202 and verifying S203 authentication input may be performed as illustrated, i.e., upon detecting a connection to the client device 12 and before establishing a connection to the associated network camera. The steps may be performed at another timing in the method than illustrated, however the verification S203 is preferably performed before the step of delivering S208, also referred to as transmitting, video to the connected client device 12. For example, the steps may be performed at a start-up of the portable device 14.

The portable device 14 may be adapted to automatically initiate the setup phase when detecting a connection to a device being of the type network camera, and otherwise initiate the operational phase. In other words, the portable device 14 may, upon detecting a connection to a device at its physical communication interface, determine which type of device that is connected and initiate either a process according to the setup phase or a process according to the operational phase depending on the device type.

The portable device 14 may be associated with two or more network cameras. Upon connection to the client device 12, a user may be prompted to input a selection of which network camera to receive data from. The user may be prompted via the connected client device 12 or be prompted to input a number or to make a selection via a physical input interface of the portable device 14. In lack of any selection, the portable device 14 may select one of the associated network cameras being tagged as the preferred or prioritized network camera.

The name server 18 comprises logic to perform a method of handling association data and current network addresses of associated network cameras. The name server is configured to receive and store association data and a current network address from a network camera upon the network camera being associated with a portable device during a setup phase. The association data comprises identities of both the network camera and its associated portable device. The association data may further comprise certificates or other authentication data that have been exchanged between the network camera and the associated portable device at the association. The name server may keep track of several associations. Upon request from a portable device during an operational phase, the name server is adapted to respond with the current network address of the network camera that is associated with the portable device. The name server may be adapted to determine, based on stored data, which network camera that is associated with the portable device. Thus, in that case, only the identity of the portable device is required in the request. In an embodiment where certificates are part of the association data, the name server may be adapted to receive a certificate from the portable device, together with the request, and verify the certificate. The network address may be sent on condition that the certificate is valid. Otherwise, a response indicating that the certificate is not valid may be sent to the portable device.

The name server thus functions as an intermediate device that stores information about network cameras and their associations. Thus, the portable device does not need to store an identity of or network address to the network camera which makes this information less accessible and thus more securely handled.

Each of the network cameras 10a-10c comprises logic for performing a method of providing data to a portable device. The method comprises, in a setup phase, connecting to a portable device, for example by detecting that a USB stick, i.e., the portable device, is inserted into a physical USB port of the network camera. Upon a connection being established, the network camera is adapted to create an association with the portable device by exchanging association data as previously exemplified. When disconnected from the portable device, the network camera may be adapted to send association data to a name server including a current network address of the network camera. The network camera may further be adapted to regularly, or upon a trigger, send its current network address to the name server as long as the association with the portable device is active. The network camera stores the association data received from the portable device, and any certificates or other data that are exchanged at the association. In an operational phase, the network camera is adapted to receive a connection request for connection from the associated portable device. The request includes the identity of the portable device, which the network camera can verify from stored association data. If a certificate or other data for setting up an encrypted connection have been exchanged at the association, the certificate or other data may be verified by the network camera and an encrypted connection may be set up between the network camera and the associated portable device. The network camera transmits data, for example video data, over the established connection to the portable device. The data may be transmitted to the portable device according to a pull mechanism or push mechanism.

Figure 4:
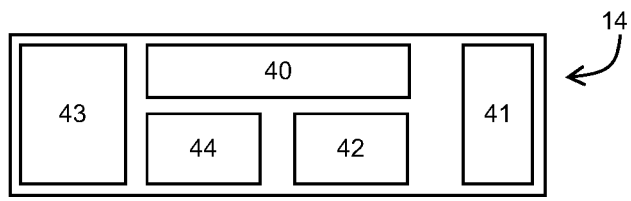
FIG. 4 illustrates components of a portable device.

FIG. 4 is an overview of hardware and software components of the portable device 14, according to one embodiment. The portable device 14 comprises a processing unit 40 which is adapted to perform the method of FIG. 3. The portable device 14 also comprises a physical communication interface 41 for exchanging data with a connected device, such as a network camera or a client device. The processing unit 40 may be adapted to setup and handle communication with a connected device via the physical communication interface 41.

The processing unit 40 may be a conventional microprocessor or microcontroller unit. The portable device 14 also comprises a memory 44 which forms a non-transitory computer-readable medium which is adapted to store computer code instructions for the processing unit 40 to run for carrying out the method. The memory 44 may be a non-volatile memory such as a read-only memory, flash memory, or ferroelectric RAM. As an alternative to the processing unit 40, circuitry in the form of one or more integrated circuits and/or field-programmable gate arrays, may be adapted to perform the method. Thus, the portable device 14 may comprise a software implementation, i.e., processing unit 40, or a hardware implementation, i.e., circuitry, or a combination of both for performing the method. In addition, it is noted that functions of illustrated components of the portable device 14 may in alternative embodiments be implemented as a single component. For example, a chip component of the portable device 14 may be configured to perform functions of two or more of the illustrated components. On the other hand, a single illustrated component of the portable device 14 may in other embodiments be implemented as a plurality of components. For example, the functions of the processing unit 40 may be performed by two or more connected microprocessors. The illustration of FIG. 4 should thus only be seen as an example.

In an embodiment where the portable device 14 is adapted to perform the steps S202 and S203 of FIG. 3, i.e., to receive and verify authentication input from a user, the portable device 14 may comprise a physical authentication interface 42. The physical authentication interface 42 may comprise numeric input elements, such as buttons, for receiving a PIN code and/or a biometric sensor, such as a fingerprint reader, for receiving a biometric data input. The physical authentication interface 42 is adapted to convert physical input at the interface 42 to digital information and provide it to the processing unit 40.

The portable device 14 may comprise further physical interfaces for enabling other functions, such as a selection of which associated network camera to receive data from.

The portable device 14 may further comprise a module for wireless communication 43. The module for wireless communication 43 may be adapted to communicate according to any standard communication protocol such as 3G/4G/5G standards or Wi-Fi. The processing unit 40 may be adapted to setup and handle communication with a connected device via the module for wireless communication 43. The module for wireless communication 43 may be utilized for communicating with a network camera 10a during a setup phase and/or during an operational phase. In the example of FIG. 1, the portable device 14 is connected via the module for wireless communication 43 to the Internet 16, via a wireless connection 15, for receiving data from its associated network camera 10a. In relevant embodiment, the module for wireless communication 43 may be utilized for retrieving a network address to the associated network camera 10a from a name server.

A benefit of the module for wireless communication 43 is that the portable device 14 may receive data from an associated network camera 10a independent of connection capabilities of the connected client device 12. The client device 12 may even be offline, i.e., not being connected to the Internet, and still receive data from a network camera 10a that is associated with the portable device 14. Another benefit of the module for wireless communication 43 is that the data from the network camera 10a may be transmitted in a more secure manner over a private connection between the network camera 10a and the portable device 14. Thus, by excluding the client device 12 as an intermediate part of the communication, the transmission is less exposed a risk of video leakage or other security issues.

In summary, the concept is a portable device 14 that provides data acquired by a network camera 10a. The portable device 14 is physically connected to a client device 12 and automatically retrieves data, e.g., in the form of video, images, or metadata thereof, from an associated network camera 10a. The data is transmitted to the client device 12 for being presented to a user. Benefits of the concept includes a flexible solution in that the portable device video from a network camera 10a can be delivered, or transmitted, to a client device 12 without the need for advanced configuration. In addition, the portable device 14 enables a user-friendly solution for providing video, or other data, at various locations and via different client devices 12. For example, temporary access to a person for monitoring video from a network camera 10a can be provided by handing over the portable device 14 that is associated with the network camera 10a. The person can perform the task without being locked to a particular location or to a dedicated client device 12.

LIST OF REFERENCE NUMERALS 10a, 10b, 10c network camera
11 connection
12 client device
13 connection
14 portable device
15 wireless connection
16 Internet
18 name server
19 connection
40 processing unit
41 physical communication interface
42 physical authentication interface
43 module for wireless communication
44 memory

The invention claimed is:

1. A method of providing data from a network camera to a connected client device, wherein the method is performed in a processing unit of a portable device having a physical communication interface, and wherein the portable device has been associated with the network camera, the method comprising:
a) upon detecting a first connection to the connected client device at the physical communication interface, establishing a second connection between the portable device and the network camera using association data received by the portable device from the network camera when the portable device became associated with the network camera,
wherein the second connection is established using a certificate of the association data by providing the certificate to a name server with a verification request and receiving a response indicating that the certificate is valid and with a network address of the network camera for the connection,
b) receiving the data comprising one or more of video data, image data, video metadata, and image metadata from the network camera via the second connection, and
c) transmitting, via the physical communication interface, the data to the connected client device.

2. The method according to claim 1, wherein the physical communication interface is a universal serial bus,
wherein establishing the first connection comprises transmitting a class code to the connected client device, and
wherein the class code is adapted for transmitting images or video.

3. The method according to claim 1, wherein the association data comprises an identity of each of the portable device and the network camera.

4. The method according to claim 1, wherein establishing the second connection comprises:
transmitting a request comprising the association data to a name server, and
receiving a response comprising a network address of the network camera.

5. The method according to claim 1, wherein the association data comprises a certificate, and
wherein the second connection is established as an encrypted connection using the certificate.

6. The method according to claim 1, wherein the portable device comprises a module for wireless communication, and
wherein the second connection to the network camera is established as a wireless connection using the module for wireless connection.

7. The method according to claim 1, wherein the portable device further comprises a physical authentication interface for receiving a user authentication input, and wherein the method further comprises:
upon detecting the first connection to the connected client device, monitoring input of the physical authentication interface,
receiving user authentication input via the physical authentication interface, and
verifying whether the user authentication input is valid or not,
wherein the second connection is performed on condition that the user authentication input is valid.

8. The method according to claim 1, wherein the second connection comprises a pull connection where data is pulled from the network camera by the portable device.

9. The method according to claim 1, wherein the second connection comprises a push connection where data is pushed from the network camera to the portable device.

10. A portable device for providing data from a network camera to a connected client device, the portable device comprising a processing unit and a physical communication interface, wherein the portable device has been associated with the network camera, and wherein the processing unit is arranged to:
a) upon detecting a first connection to the connected client device at the physical communication interface, establish a second connection between the portable device and the network camera using association data received by the portable device from the network camera when the portable device became associated with the network camera,
b) receive the data comprising one or more of video data, image data, video metadata, and image metadata from the network camera via the second connection, and
c) transmit, via the physical communication interface, the data to the connected client device.

11. The portable device according to claim 10, wherein the physical communication interface is a universal serial bus (USB), and wherein the processing unit is arranged to transmit a class code to the connected client device, wherein the class code is adapted for transmitting images or video.

12. The portable device according to claim 10, further comprising a module for wireless communication, wherein the second connection to the network camera is established as a wireless connection using the module for wireless connection.

13. The portable device according to claim 10, further comprising a physical authentication interface for receiving a user authentication input, wherein the processing unit is further arranged to:
- upon detecting the first connection to the connected client device, monitor input of the physical authentication interface,
- receive user authentication input via the physical authentication interface, and
- verify whether the user authentication input is valid or not, wherein the processing unit is arranged to establish a second connection to the network camera on condition that the received user authentication input is valid.

14. A system comprising a network camera and a portable device, the system being adapted to:
- exchange association data between the portable device and the network camera to create an association,
- upon detecting a first connection to a connected client device at a physical communication interface of the portable device, establish a second connection between the portable device and the network camera using the association data,
- wherein the second connection is established using a certificate of the association data by providing the certificate to a name server with a verification request and receiving a response indicating that the certificate is valid and with a network address of the network camera for the connection,
- transmit data comprising one or more of video data, image data, video metadata, and image metadata from the network camera to the portable device via the second connection, and
- the system being further adapted to transmit the data from the portable device to the connected client device via the physical communication interface.

15. The system according to claim 14, further comprising a name server, wherein the system is further adapted to:
- upon detecting the first connection to the connected client device at the physical communication interface of the portable device, transmitting a request to the name server comprising at least a part of the association data, and
- in response to receiving the request at the name server, transmitting a network address of the network camera associated with the portable device to the portable device.

* * * * *